Figure 1:
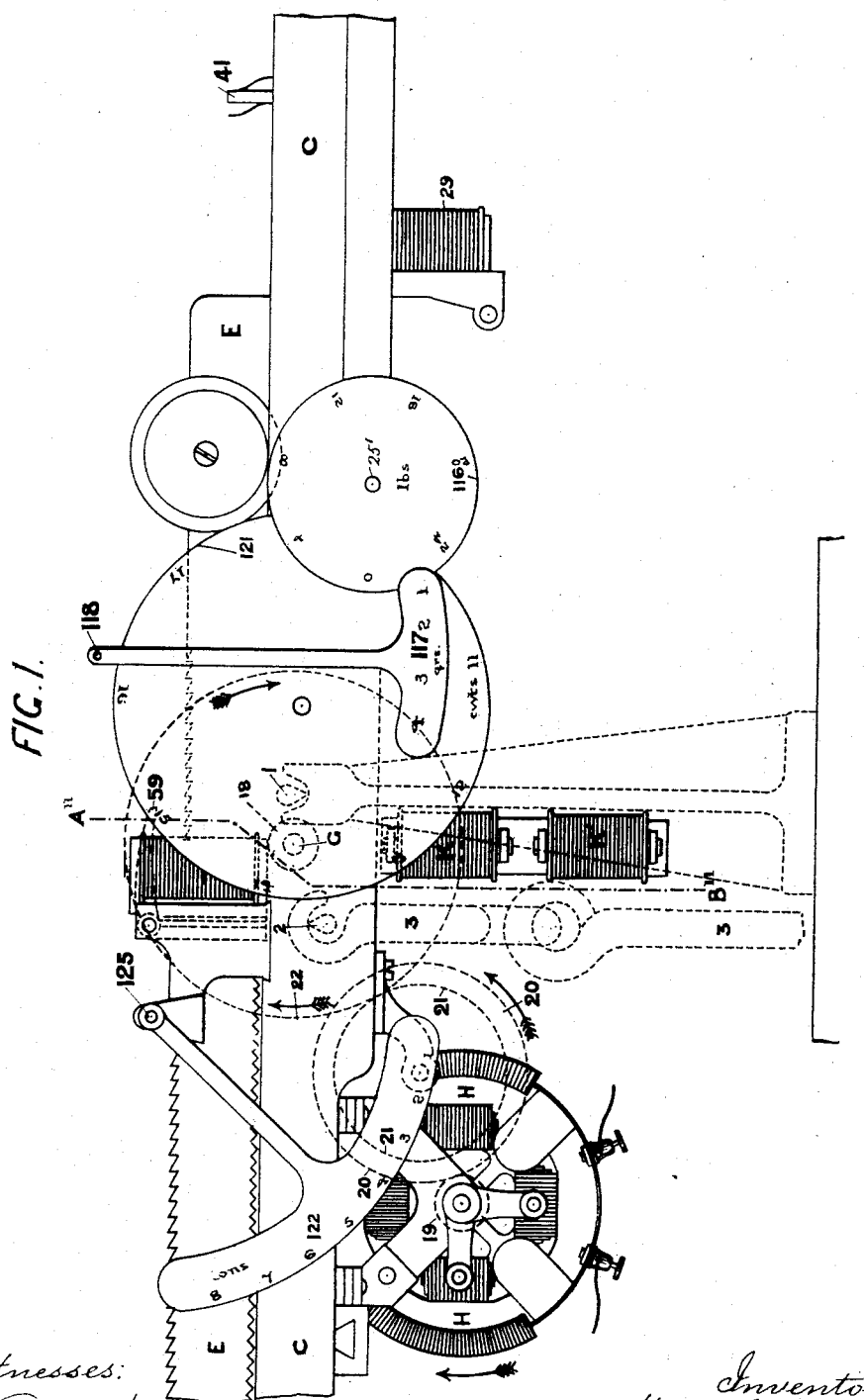

(No Model.) 11 Sheets—Sheet 2.

W. SNÊLGROVE.
ELECTRICAL WEIGHING MACHINE.

No. 436,910. Patented Sept. 23, 1890.

Witnesses:
Walter Allen
A. W. Bright

Inventor,
Wm. Snêlgrove.
by Herbert W. T. Jenner
Attorney.

(No Model.) 11 Sheets—Sheet 3.

W. SNÊLGROVE.
ELECTRICAL WEIGHING MACHINE.

No. 436,910. Patented Sept. 23, 1890.

Witnesses:
Walter Allen
A. W. Bright

Inventor
Wm. Snêlgrove
by Herbert W. T. Jenner
Attorney.

THE NORRIS PETERS CO., PHOTO-LITHO., WASHINGTON, D. C.

(No Model.) 11 Sheets—Sheet 4.

W. SNÊLGROVE.
ELECTRICAL WEIGHING MACHINE.

No. 436,910. Patented Sept. 23, 1890.

Witnesses
Walter Allen
A. W. Bright

Inventor
Wm. Snêlgrove
by Herbert W. T. Jenner
Attorney (No Model.) 11 Sheets—Sheet 5.
W. SNÊLGROVE.
ELECTRICAL WEIGHING MACHINE.
No. 436,910. Patented Sept. 23, 1890.
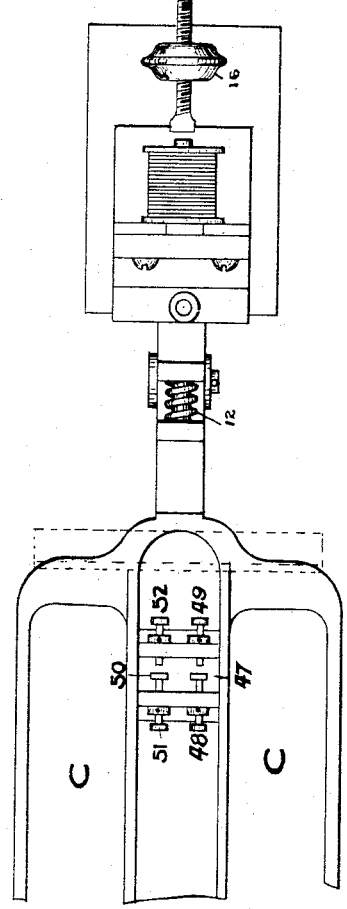
FIG. 8.
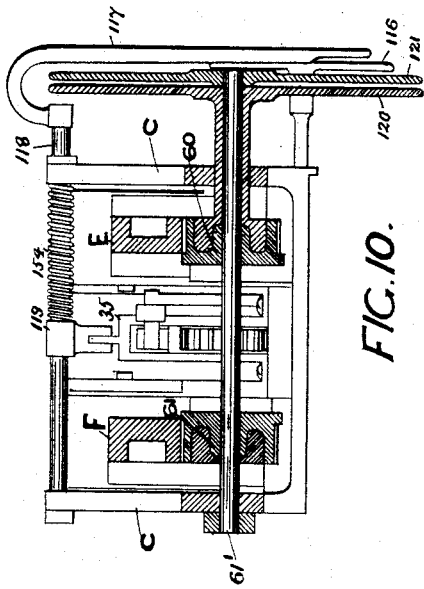
FIG. 10.
FIG. 9.
FIG. 11.
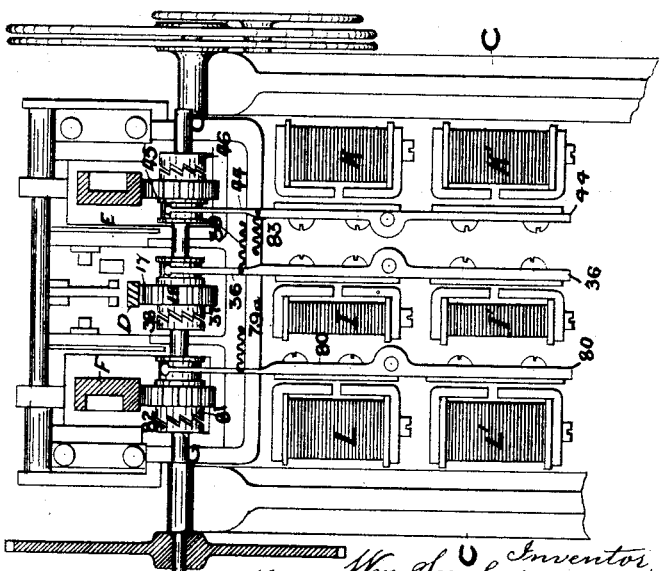
Witnesses:
Walter Allen
A. W. Bright
Inventor
Wm. Snelgrove
by Herbert W. T. Jenner
Attorney (No Model.) 11 Sheets—Sheet 6.
W. SNÊLGROVE.
ELECTRICAL WEIGHING MACHINE.
No. 436,910. Patented Sept. 23, 1890.
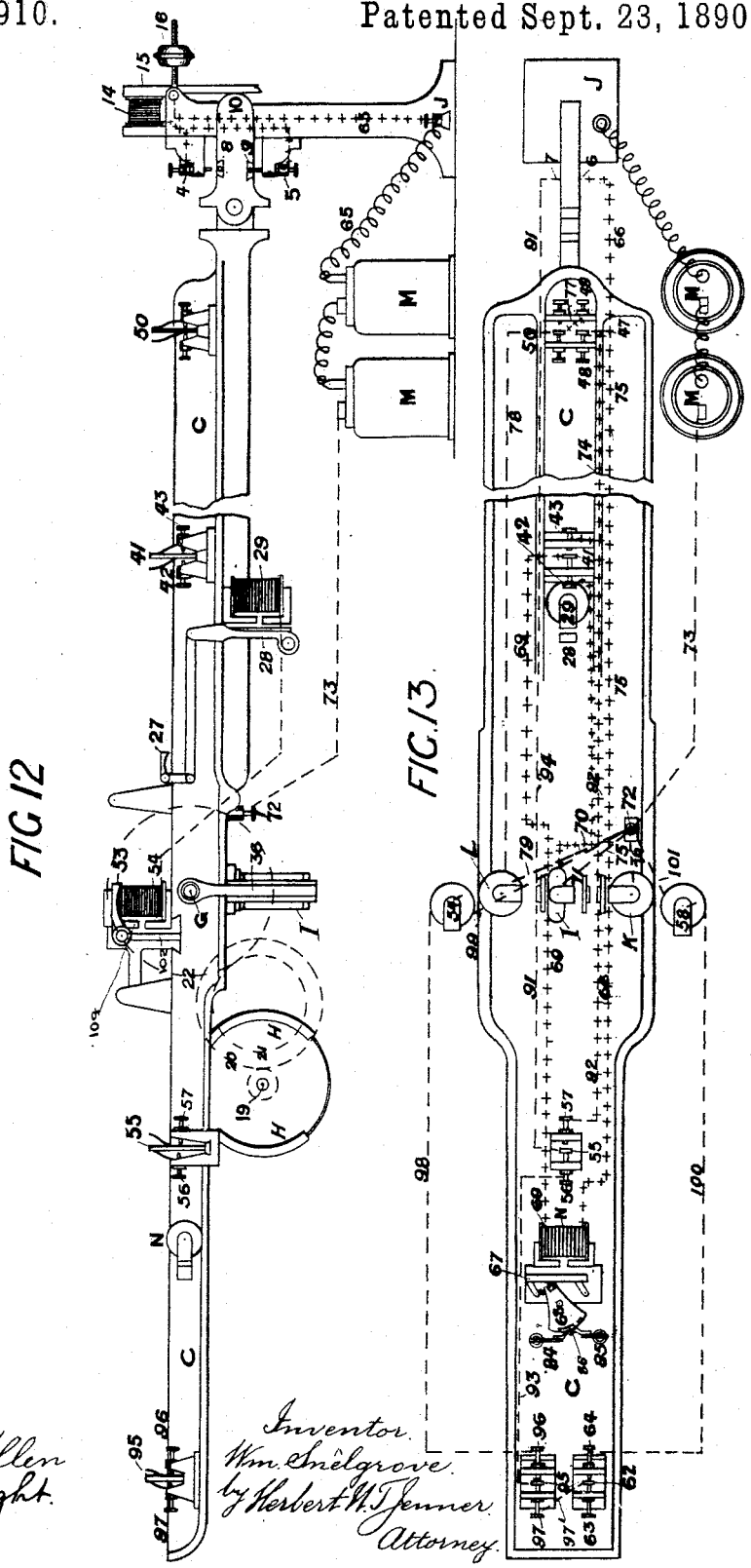
Witnesses:
Walter Allen
A. W. Bright
Inventor
Wm. Snêlgrove
by Herbert W. T. Jenner
Attorney (No Model.) 11 Sheets—Sheet 7.

W. SNÊLGROVE.
ELECTRICAL WEIGHING MACHINE.

No. 436,910. Patented Sept. 23, 1890.

Witnesses:
Walter Allen
A. W. Bright

Inventor.
Wm. Snêlgrove.
by Herbert W. T. Jenner.
Attorney.

(No Model.) 11 Sheets—Sheet 8.
W. SNÊLGROVE.
ELECTRICAL WEIGHING MACHINE.
No. 436,910. Patented Sept. 23, 1890.
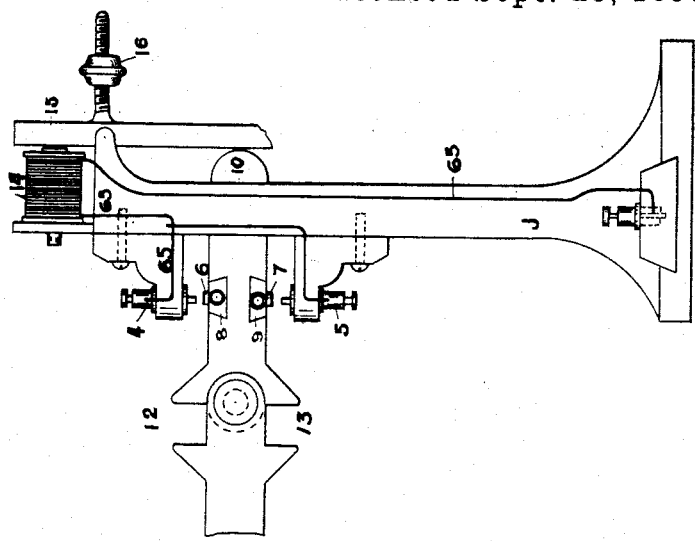
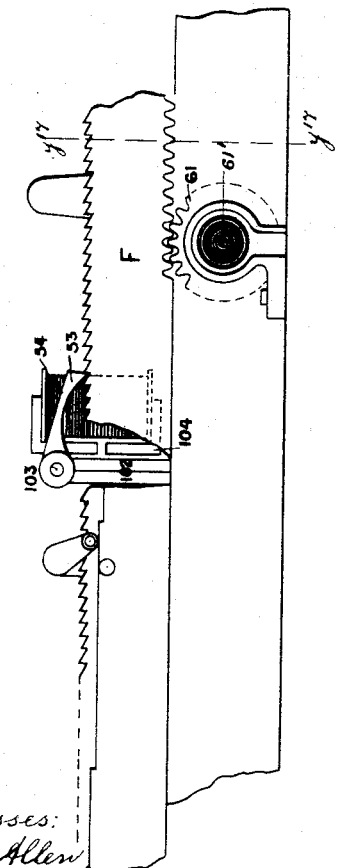
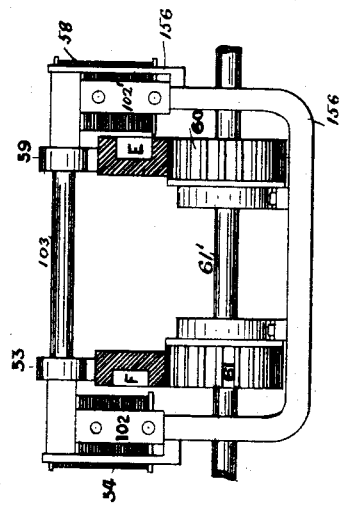
Witnesses:
Walter Allen
A. W. Bright
Inventor.
Wm. Snêlgrove.
by Herbert W. T. Jenner.
Attorney.

(No Model.) 11 Sheets—Sheet 9.
W. SNÊLGROVE.
ELECTRICAL WEIGHING MACHINE.
No. 436,910. Patented Sept. 23, 1890.
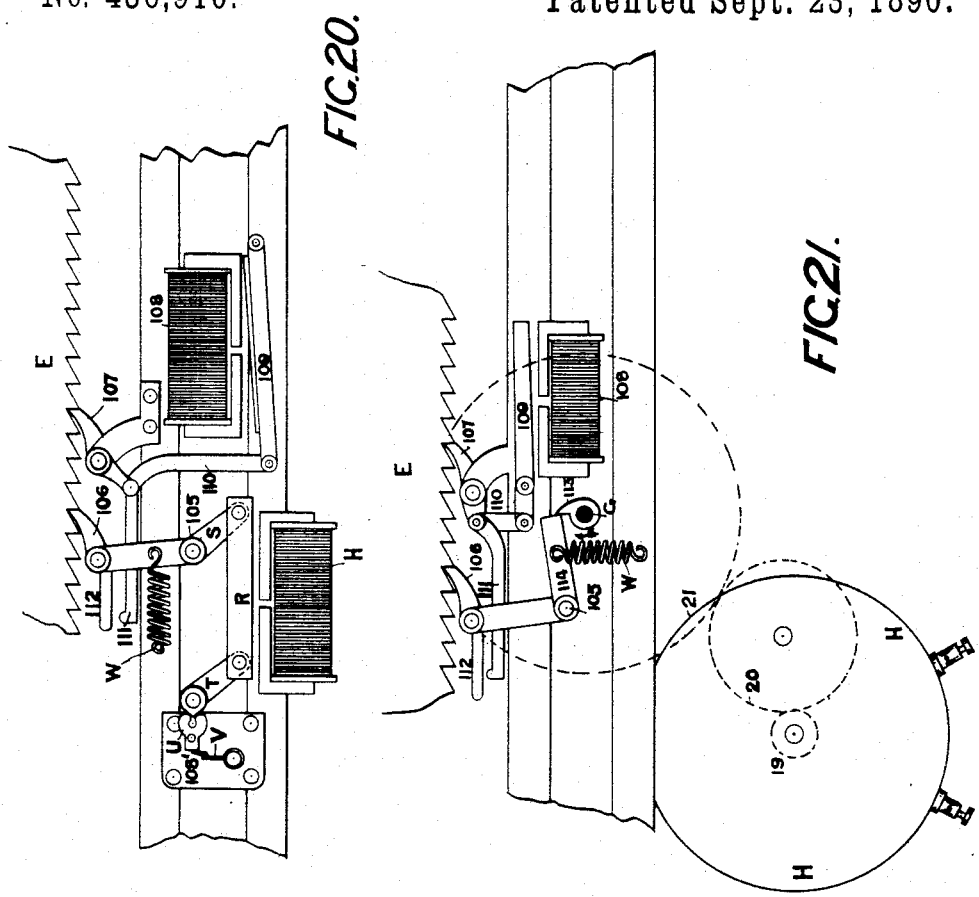

(No Model.) 11 Sheets—Sheet 10.
W. SNÊLGROVE.
ELECTRICAL WEIGHING MACHINE.
No. 436,910. Patented Sept. 23, 1890.
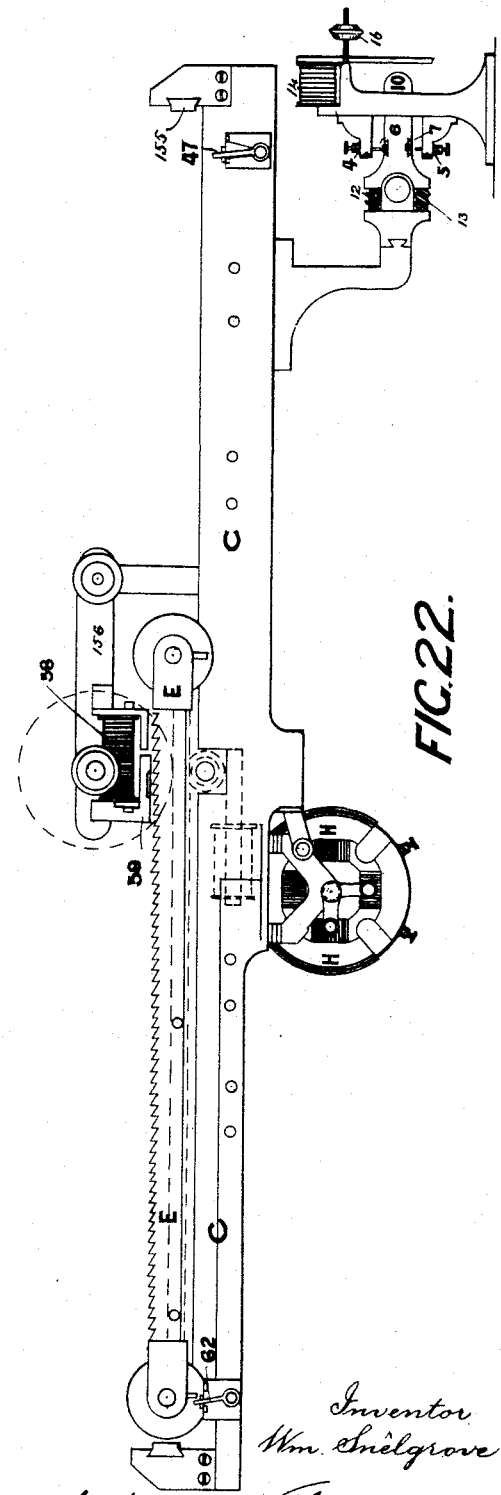
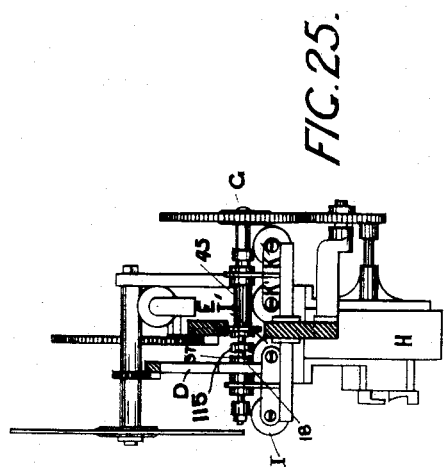
Witnesses:
Walter Allen
A. W. Bright
Inventor
Wm. Snêlgrove.
by Herbert W. T. Jenner
Attorney

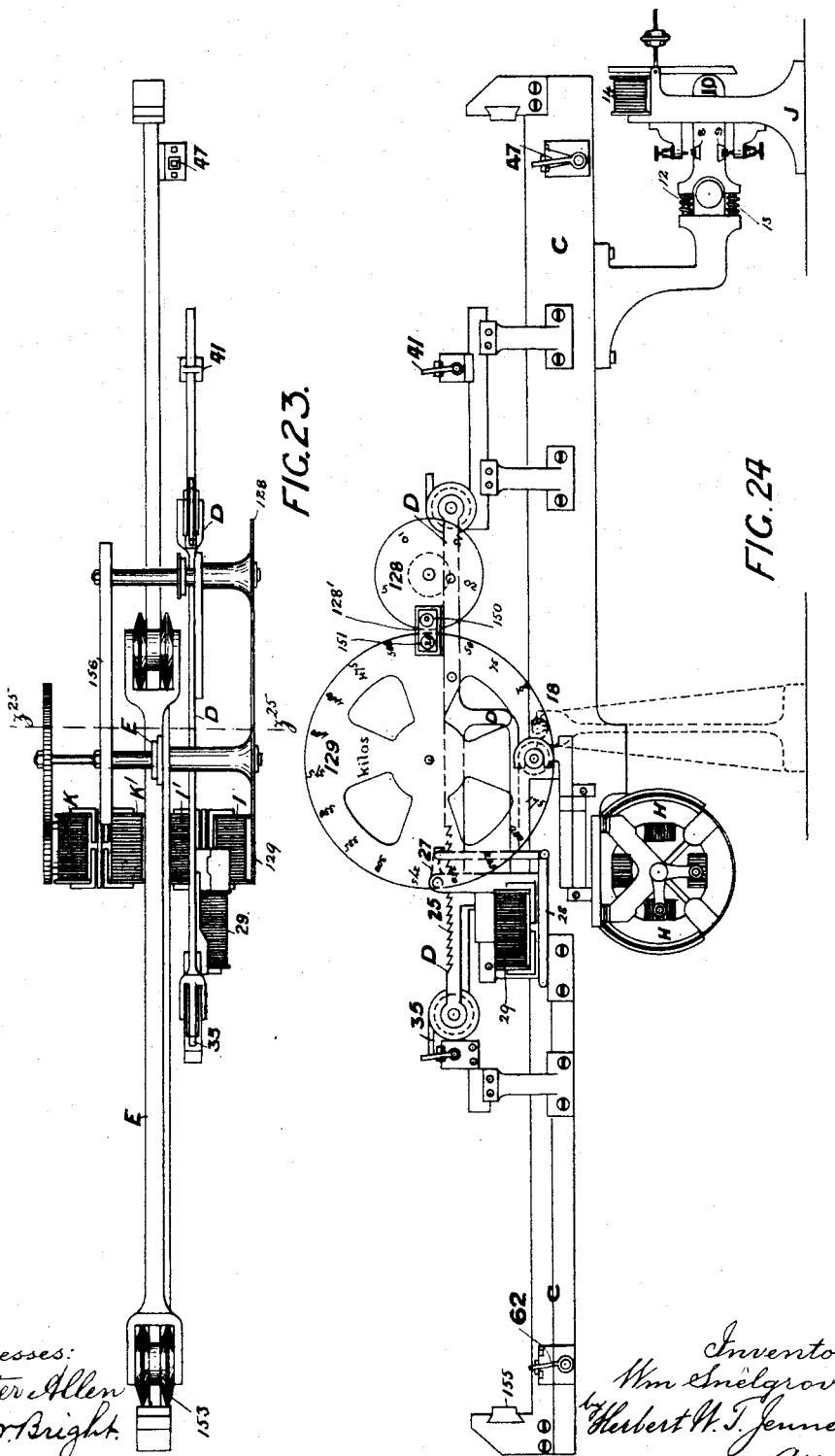

UNITED STATES PATENT OFFICE.

WILLIAM SNÊLGROVE, OF KING'S NORTON, ENGLAND.

ELECTRICAL WEIGHING-MACHINE.

SPECIFICATION forming part of Letters Patent No. 436,910, dated September 23, 1890.

Application filed March 21, 1890. Serial No. 344,823. (No model.) Patented in England August 3, 1888, No. 11,251; in France May 28, 1889, No. 198,491, and in Belgium May 29, 1889, No. 86,387.

*To all whom it may concern:*

Be it known that I, WILLIAM SNÊLGROVE, a citizen of Great Britain, residing at King's Norton, in the county of Worcester, England, have invented certain new and useful Improvements in Electric Weighing-Machines, (for which I have obtained patents in England, No. 11,251, dated August 3, 1888; in France, No. 198,491, dated May 28, 1889, and in Belgium, No. 86,387, dated May 29, 1889;) and I do hereby declare the following to be a full, clear, and exact description of the invention, such as will enable others skilled in the art to which it appertains to make and use the same.

This invention relates to weighing-machines in which a poise on the steelyard is automatically actuated by an electric motor, which is brought into action by the motion of the said steelyard under the influence of the load being weighed.

This invention consists in the novel construction and combination of parts, as hereinafter fully described and claimed.

Figure 2:
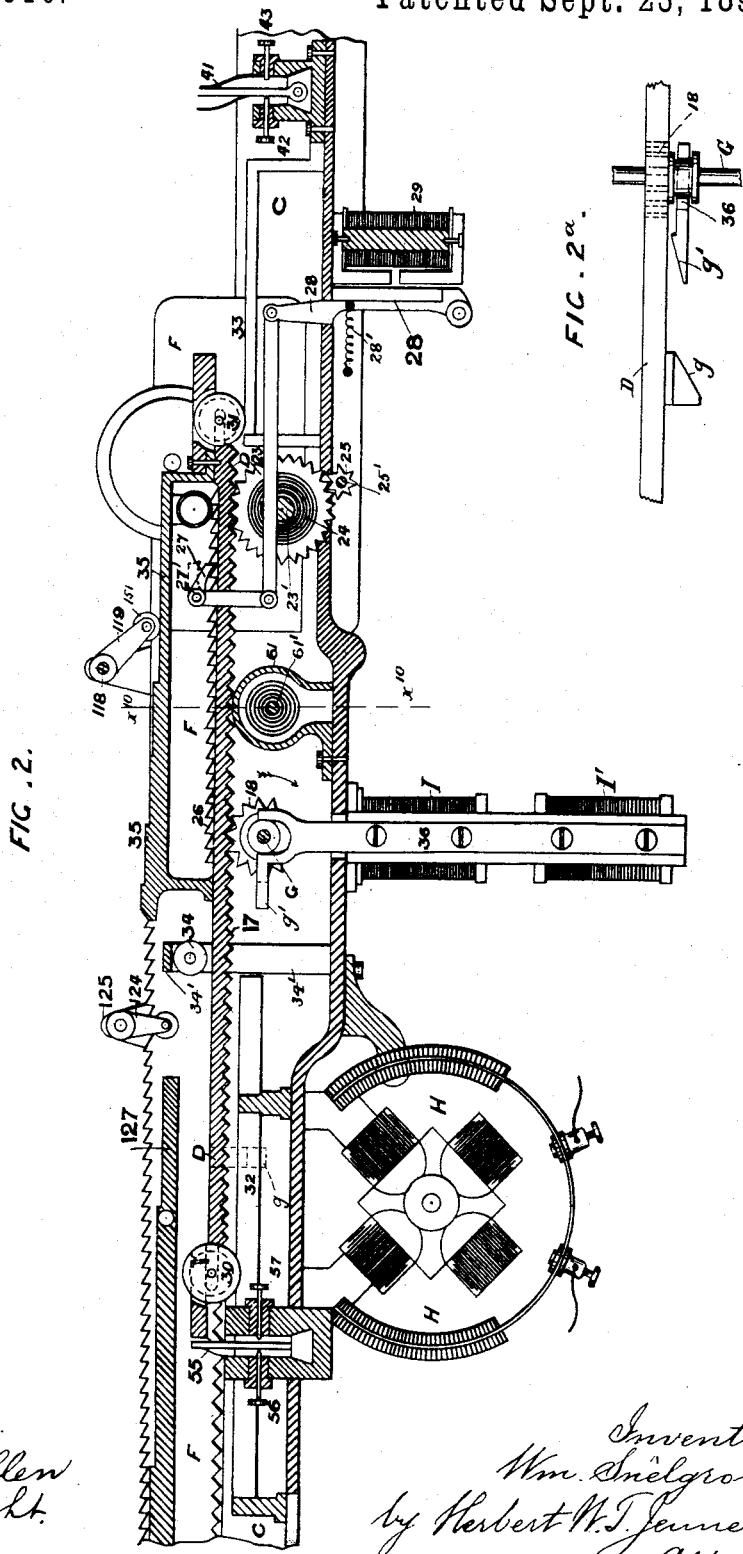
Figure 3:
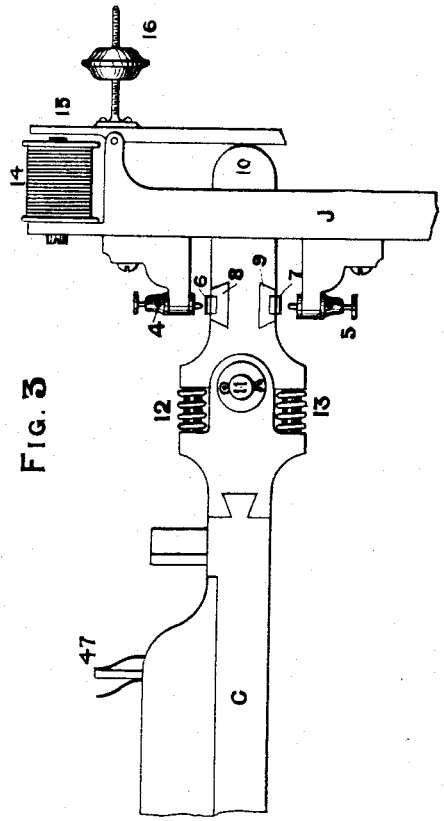
Figure 4:
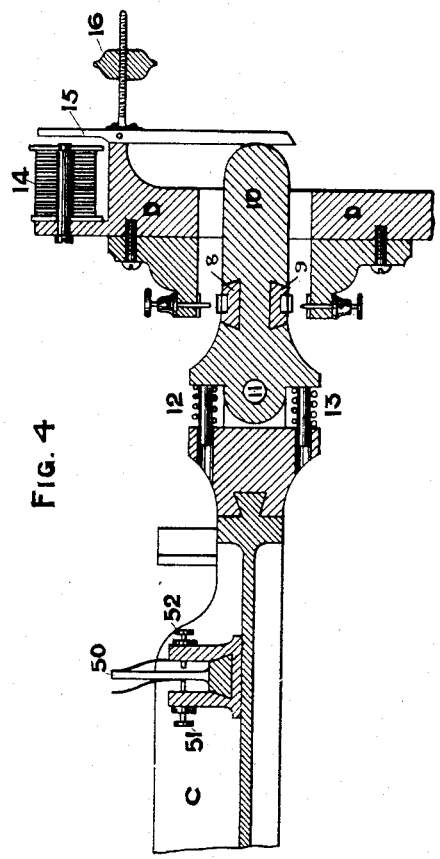
Figure 5:
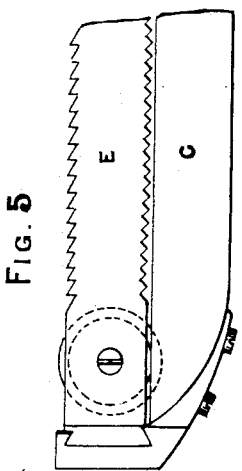
Figure 6:
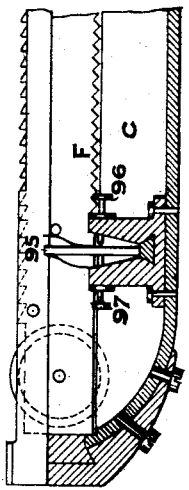
Figure 7:
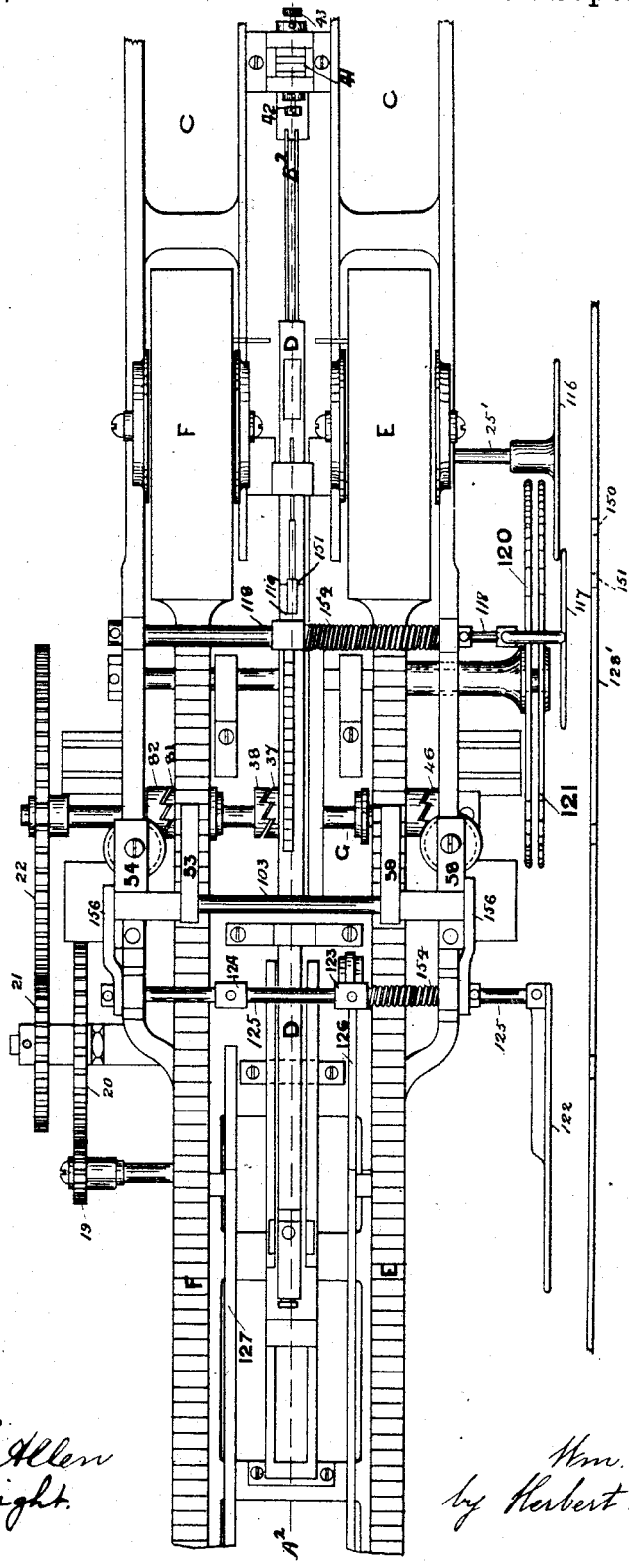
Figure 14:
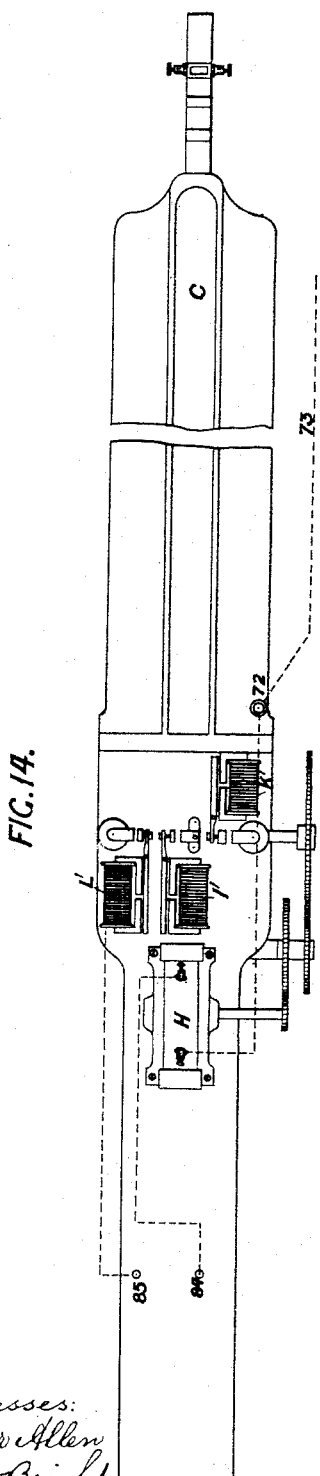
Figure 15:
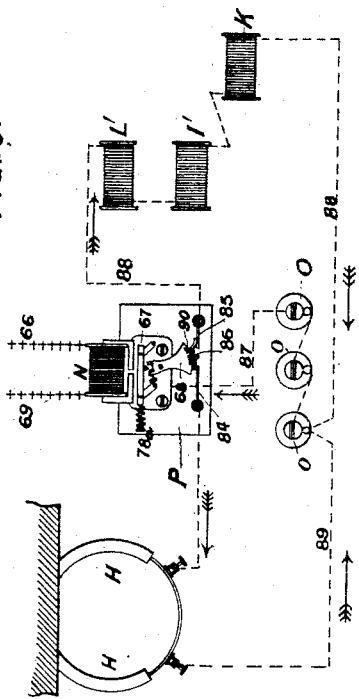

In the drawings, Figure 1 is a side elevation of the middle portion of the steelyard of a weighing-machine constructed according to this invention, the ends being broken off to permit it to be drawn to a sufficiently large scale. Fig. 2 is a longitudinal section taken on line $A^2$ $B^2$ in Fig. 7. Fig. $2^a$ is a detail plan view of wedge $g$. Figs. 3 and 5 are side views of the ends of the steelyard which could not be included in Fig. 1. Figs. 4 and 6 are longitudinal sections of the ends shown in Figs. 3 and 5 and are continuations of the section shown in Fig. 2. Fig. 7 is a plan view of the middle portion of the steelyard shown in Fig. 1. Figs. 8 and 9 are plan views of the ends of the steelyard shown in Figs. 3 and 5, respectively. Fig. 10 is a cross-section taken on line $x^{10}$ $x^{10}$ in Fig. 2. Fig. 11 is a cross-section taken on line $A^{11}$ $B^{11}$ in Fig. 1. Fig. 12 is a diagrammatic side view showing the arrangement of the wires for conducting the electric current to the various parts of the machine. Fig. 13 is a plan view from above, and Fig. 14 is a plan view from below, of the parts shown in Fig. 12. Fig. 15 is a diagram drawn to a larger scale, showing a plan view of the devices for actuating the electric motor and their connection therewith. Fig. 16 is a detail side view of a portion of one of the heavy poises, showing its stop-pawl and spring-actuated return-wheel. Fig. 17 is a cross-section taken on line $y^{17}$ $y^{17}$ in Fig. 16. Figs. 18 and 19 are respectively detail side and end views of the carrier-bracket, showing the contact-springs and their connections. Figs. 20 and 21 are side views showing details of two forms of intermediate ratchet mechanism adapted to be interposed between the electric motor and the poise actuated thereby. Figs. 22 to 25 show a modification of the machine. Fig. 22 is a side view with the registering devices and other parts removed. Fig. 23 is a plan of the machine shown in Fig. 22. Fig. 24 is a side view of the same, showing the registering-disks. Fig. 25 is a cross-section on line $z^{25}$ $z^{25}$ in Fig. 23.

C is the steelyard or beam of a weighing-machine balanced upon a knife-edge 1 and adapted to communicate with a weighing-platform by the knife-edge 2 and links 3. (Shown in dotted lines in Fig. 1.) The beam C of the weighing-machine is of the kind adapted to be used as a steelyard and is hereinafter referred to by that name; but the improvements may be applied to weighing-machines provided with beams of other approved forms. To avoid confusion, these knife-edges and the supporting-brackets are omitted from the remaining figures, as they are not claimed in connection with this invention, and may be of any approved construction.

The free end 10 of the beam or steelyard, Fig. 3, oscillates when weighing between the upper insulated contact-screw 4 and the lower insulated contact-screw 5, which screws are supported by the carrier-bracket J. Contact-springs 6 and 7 are secured to the end 10 of the beam or steelyard opposite the said screws, and the said springs are insulated from the steelyard and from each other by the non-conducting pieces 8 and 9. The end 10 of the beam or steelyard may be formed integral with it; but it is preferable to form it of a separate piece and pivot it to the steelyard by the pin 11. Springs 12 and 13 are arranged so as to form buffers between the end 10 and the main part of the steelyard above and below the pivot-pin, and these springs keep the said end in line with the main part of the steelyard. The elasticity of springs 12 and 13 prevents the contact-springs from striking against the contact-screws with such violence as to injure them. When the end 10 is made integral with the beam or steelyard or rigidly attached thereto, it may be provided with contact-springs of great elasticity, so that they will take up shock as well as conduct the current; but it is preferable to make the end separate and flexible, as described.

In order to prevent undue oscillation after balancing, a lever 15 is pivoted to bracket J and arranged to press against the end 10, the amount of pressure being regulated by the adjustable weight 16. An electro-magnet 14 is included in the circuit with the screws 4 and 5. Whenever the current passes through the screws to the steelyard, it excites the electro-magnet 14, which attracts the armature end of lever 15 and lifts said lever out of contact with the end 10. The steelyard is therefore perfectly free from friction while weighing; but the moment the circuit is interrupted by either contact-spring leaving its screw the lever 15 presses against the end 10, and by its slight friction prevents undue oscillation.

In the machine shown in Figs. 1 to 11 three poises D, E, and F are used, and all three are shown in Figs. 7 and 11. All three poises are similar in construction, each consisting of a traveling rod provided with teeth for moving it along the steelyard. The poises are of graduated weight, and poise D, which is the center poise, is the lightest of the three.

The light poise D (shown in Fig. 2) is provided with end wheels 30 31, which run upon rails 32 33, and 34 is a guide-wheel (mounted in the poise guide-wheel bracket 34') which keeps the poise in position, so that it runs freely upon its supporting-rails. The poises E and F are supported in a similar manner, so that they may slide freely along the steelyard. The light poise D is provided with the ratchet-teeth 26 upon its upper side, with which the stop-pawl 27 may engage, as hereinafter more fully described, and 17 are teeth upon the under side of the poise for propelling it along. A single set of ratchet-teeth may be used, if desired, separate propelling and stop pawls being provided, as will be hereinafter more fully described.

In a simple arrangement for traveling the poise D the teeth 17 gear into a wheel 18, which is mounted on a shaft G, and the shaft G is revolved by the revoluble electric motor H, positively connected thereto by the train of wheels 19 20 21 22, mounted on suitable shafts and shown in dotted lines in Fig. 1 and in full lines in Fig. 7. The pinion 18 slides loose upon shaft G, and is provided with clutch-teeth 37 upon one side of it, as shown in Fig. 11. A toothed clutch 38 is secured to shaft G, and the clutch-teeth 37 are slid into and out of gear therewith by means of the armature-lever 36, which slides the wheel 18 upon the shaft G, the cogs of said wheel always remaining in gear with the teeth 17 on the poise. When the wheel 18 is in position to be driven by the shaft G, it rotates in the direction of the arrows, (see Fig. 2,) and the light poise D is caused to travel from the knife-edge fulcrum 1 toward the free end 10 of the steelyard. A wheel 23, mounted on shaft 23', is driven by the teeth 17 of the poise D and coils up a spring 24 as the poise advances, and a pinion 25 is in turn driven by the wheel 23 and is used in connection with the registering mechanism, as will be more fully described hereinafter.

The poises E and F are provided with actuating devices similar to poise D.

When a load is placed upon the weighing-platform, the free end of the steelyard rises, and the contact-spring 6 touches the end of connecting-screw 4 and permits a current from an electric battery M to pass to the electric motor H and also to the electro-magnet I. The current causes the motor to revolve in the direction of the arrow in Fig 1 and excites the electro-magnet I simultaneously, causing said magnet to attract the armature-lever 36, which moves the wheel 18 along the shaft G, so that its clutch-teeth 37 engage with the toothed clutch 38, secured upon the shaft G. The wheel 18 then rotates with said shaft and moves forward the light poise D. If at any portion of its travel the weight of the light poise is sufficient to balance or overbalance the load, the beam or steelyard end 10 descends and the contact between the screw 4 and the spring 6 is broken, the current ceases to excite the motor and the electro-magnet, the motor stops, and a spring 39 pulls off the armature-lever from the electro-magnet, moving the wheel 18 and causing the teeth 37 to be disengaged from those of the clutch 38. The poise D stops and its position indicates the weight of the load. The spring-actuated wheel 23 tends to drive the poise back again to zero, but is prevented from doing so by the pawl 27, which falls into the teeth 26. If the load be removed from the platform, the end 10 of the steelyard descends and the contact-spring 7 touches the connecting-screw 5. This places an electro-magnet 29 in circuit with the battery. The stop-pawl 27 is pivoted on a pin 27', (see Fig. 2,) and is operatively connected with the pivoted armature-lever 28, which is provided with a spring 28', which normally holds the stop-pawl in gear with the ratchet-teeth. When the electro-magnet 29 is excited, it attracts the armature-lever 28 and raises the pawl 27, as shown by the dotted lines in Fig. 2. The spring-actuated wheel 23 then rotates and drives the light poise D back again to zero, where it strikes against a switch-lever 55 and breaks the circuit through the electro-magnet 29. The spring 28' pulls off the lever 28 from the electro-magnet 29 and permits the pawl 27 to re-engage with the ratchet-teeth 26, ready for another weighing.

It is obvious that various mechanical equivalents—such as descending weights or weighted levers—can be used in place of a spring to actuate the wheel 23 and return the poise.

If the light poise is insufficient to balance the load, the said poise moves to its extreme out position and its end strikes a contact-lever 41, breaks contact with a screw 42, and makes contact with a screw 43, which screws are insulated from each other and from their contact-lever 41. The wire connection with the battery is arranged so that this movement of the lever 41 interrupts the current exciting the electro-magnet I and permits the withdrawal of the clutch-teeth of the wheel 18 from the clutch 38 on the shaft G and the poise D stops. The said movement of lever 41 passes the current from screw 43 to an electro-magnet K, similar to electro-magnet I, and shown in Fig. 11. The electro-magnet K is provided with an armature-lever 44, which it attracts, and thereby slides a clutch-wheel 45 into gear with a toothed clutch 46, secured on shaft G in a similar manner to which the wheel 18 was operated, as before described. The teeth of wheel 45 engage with the teeth on the under side of the heavy poise E, and the said poise is propelled along the steelyard by the motor H until by balancing or overbalancing the load it breaks the circuit by causing the end of the steelyard to descend and leave the upper connecting-screw. If the poise E does not balance the load, it brings the second heavy poise F into action by striking the contact-lever 47, (shown in Fig. 8,) breaking contact with the screw 48 and making it with screw 49. The poise F moves outwardly in a similar manner to poise E, and if when it has completed its out movement all the poises will not balance the load the poise F strikes the contact-lever 50, and by breaking contact with screw 51 and making it with screw 52 interrupts the current from the battery. (See Fig. 4.) This movement of lever 50 causes the clutch-teeth of the actuating-wheel of poise F to be withdrawn from the fixed clutch on the main shaft G, while the motor-current is also interrupted and the motor stops.

When the load is removed from the platform, the end 10 of the steelyard descends and makes contact with the lower screw 5. The current from the battery then passes through the electro-magnet 29, which lifts the pawl 27 and permits the light poise D to be moved back to zero by its spring-actuated wheel 23, as before described. When the light poise arrives at its zero position, it strikes a contact or switch lever 55, which breaks contact with a screw 57 and makes contact with a screw 56. This excites an electro-magnet 54, which raises the pawl 53 out of gear with the ratchet-teeth on top of poise F. (Shown in Figs. 7, 16, and 17.) The poise F then returns to its zero position, being propelled by a spring-actuated wheel 61 in a similar manner to poise D. The poise E is also provided with a spring-actuated wheel 60, mounted on shaft 61', (see Fig. 10,) for returning it, which is also similar to the spring-actuated wheel 23 of poise D. When the heavy poise F reaches its zero position, it strikes a contact-lever 95 (see Fig. 6) and passes the current by the screw 97 to the electro-magnet 58, (see Fig. 7), thereby causing the latter to raise the pawl 59 out of gear with the ratchet-teeth on top of poise E. The poise E is then propelled back to its zero position by its spring-actuated wheel 60. (Shown in Fig. 17.) When poise E reaches its zero position, the end 10 of the steelyard rises out of contact with the lower screw 5 and the steelyard is again in equilibrium and ready to weigh another load.

The various switch or contact levers above referred to are mounted in the paths of the poises in such positions that they may be struck by the poises, as described.

When only one electric battery is used, all the contact-screws and devices hereinbefore described are connected to it in series by suitable wires.

If desired, the electric motor may be permitted to run continuously, being always included in the circuit, and the various contact-levers being used to shunt the current from one electro-magnet to another, thereby controlling the clutch mechanism and lifting the stop-pawls in rotation, as before described.

Any convenient form of battery or dynamo may be used for generating the current.

With a machine having more than one poise it is usually preferable to use two separate batteries—one to actuate the electric motor and the other to control the clutch-wheels and pawls. Figs. 12 to 15 show the directions taken by the electric currents when two batteries are used.

When a load is placed upon the platform, the steelyard end rises and makes contact with the upper connecting-screw 4, and the current passes from the battery M over the wire 65 (shown in cross dotted lines on the bracket J) to the electro-magnet 14, and thence by branches to both of the connecting-screws 4 and 5. When the steelyard end makes contact with screw 4, the current passes by wire 65 from the spring 6 (see Fig. 13) to the electro-magnet N, and by exciting it attracts an armature 67, which moves a switch-lever 68, and thereby completes the circuit from a second battery O through the electric motor and causes the motor to start. The details of the the wire connection and the arrangement of the electric-motor switch-lever are shown to a larger scale in Fig. 15 and will be more fully described hereinafter. From the electro-magnet N the current from battery M passes by the wire 69, through the contact-lever 41 and screw 42, down the wire 70 to the electro-magnet I, and thence by the return-wire 71 (shown in plain dotted lines) to the connecting-screw 72, from which it passes to the other pole of the battery M by the wire 73. The light poise clutch-wheel is moved into gear with the fixed clutch on the shaft G by the action of the electro-magnet I, and the light poise is propelled outward until the steelyard end falls and breaks circuit, or until the poise reaches the outer extreme of its travel. In the latter case it touches the contact-lever 41 and removes it from contact with the screw 42 and presses it against the screw 43. This interrupts the current from the wire 69 to the wire 70 and electrically connects said wire 69 with the wire 74, which connects the screw 43 with the lever 47. From the lever 47 the current passes by the screw 48 and the wire 75 to the electro-magnet K, and thence down the wire 76 to the screw 72, which is in permanent electrical connection with the battery M by the wire 73, as before described. The electro-magnet K moves the clutch-wheel 45 of the heavy poise E into gear with its fixed clutch on shaft G, and the poise E commences to travel out. If the poise E at the end of its travel is insufficient to balance the load, it strikes the contact-lever 47 and makes connection between the wires 74 and 77 through the screw 49. The wire 77 connects the screw 49 with the contact-lever 50, to which also the wire 78 is connected. The other end of the wire 78 is connected to the electro-magnet L, which actuates the clutch-wheel of poise F, and the circuit is completed by the wire 79, which connects the electro-magnet L with the return screw 72. The clutch-wheel of poise F being moved into gear with its fixed clutch by the electro-magnet L, the poise F is caused to travel out. When poise F attains a position in equilibrium with the load, the end of the steelyard descends out of contact with the upper screw 4. The circuit with the battery M is therefore interrupted as the end 10 vibrates between the upper screw 4 and the lower screw 5 without touching either of them. This interruption of the circuit demagnetizes the electro-magnets N and L. The armature of electro-magnet N is pulled away from it by the spring 78ᵃ, Fig. 15, and moves the switch-lever 68 into the position which interrupts the circuit from the battery O, and thereby stops the motor H. The armature-lever 80 is simultaneously pulled away from the electro-magnet L, Fig. 11, and moves the clutch-wheel 81 out of gear with the fixed clutch 82. The poise F therefore stops at once, and the positions of the three poises indicate the weight of the load on the platform of the weighing-machine.

The interruption of the current which holds the clutch-wheels in gear with the fixed clutches by each poise striking its switch-out lever at the end of its travel of course allows the armature-lever springs to pull the said wheels out of gear with the clutches; but as an additional precaution against their continuing too long in gear and thereby over-running and breaking some part of the machine a wedge or incline $g$ is formed on or attached to each poise (see Fig. 2ᵃ) and pushes the clutch-wheel out of gear with the clutch at the end of its out travel (by striking a projection $g'$ on the armature-lever) independent of electrical disconnection.

In order that the clutch-wheels may be drawn out of gear with the clutches 38, 46, and 82 instantaneously when the steelyard balances, electro-magnets may be used to withdraw them from gear as well as to move them into gear, or both springs and electro-magnets may be used.

Fig. 11 shows a practical arrangement of withdrawing electro-magnets, and the diagrams in Figs. 14 and 15 explain the electrical connections.

The electro-magnet N is provided with a swinging armature 67, having a spring 78ᵃ for drawing it back. A pivoted segment 68 is moved by a projection on the armature 67, and 84 and 85 are two insulated springs which bear against said segment, the face of which is provided with two insulating-pieces 86 and 90.

P is a metal plate which is in electrical connection with one pole of the battery O and with the segment 68. Spring 84 is connected with one terminal of the electric motor H, and spring 85 connects with the other pole of battery O through the wires 88 and electro-magnets L' I' K', the said other pole of the battery being also connected with the other pole of the electric motor H by the wire 89. When the electro-magnet N is not excited, the ends of springs 84 and 85 rest against the insulated piece 86 of the segment 68, as shown in Fig. 13, so that the electro-magnets L', I', and K' are not excited. When the electro-magnet N is excited, it attracts the armature 67, which turns the segment so that the end of spring 84 contacts with the metal and the end of spring 85 rests upon the insulating-piece 90. The whole current of battery O then passes through the electric motor, causing it to start; but while the segment 68 is moving under the influence of electro-magnet N the end of spring 85 momentarily touches the metal of segment 68 between the two insulating-pieces 86 and 90 and the whole current for that instant is sent through the withdrawing electro-magnets L', I', and K'. (See Fig. 15.) These electro-magnets do not, however, draw all the clutch-wheels out of gear with their fixed clutches, because the current which excites the electro-magnet N also passes through one of the electro-magnets I K L, which are adapted to move said wheels into gear with the clutches. When, however, the circuit which excites the electro-magnet N is interrupted by the descent of the steelyard end, neither of the electro-magnets I K L is excited, and consequently the momentary current through electro-magnets I' K' L' at once withdraws whichever of the clutch-wheels is in gear with its clutch at the time and insures that the remaining wheels are perfectly clear of their clutches on shaft G. If by the rapid out movement of either heavy poise the beam or steelyard overbalances suddenly, so that the spring 7 comes in contact with the lower connecting-screw 5, then the current passes through spring 7 (see Figs. 12, 13, and 19) by wire 91 to the switch-lever 55, thence by screw 57 and wire 92 to electro-magnet 29, the armature-lever 28 of which it attracts, thereby lifting the pawl 27 out of gear with the ratchet-teeth on the upper side of the light poise D. The clutch-withdrawing electro-magnets I' K' L' are included in the circuit of the wire 91 by a junction-loop carried around said magnets and having its ends connected with the straight portions of said wire at the point 94, (see Fig. 13,) and simultaneously with the lifting of pawl 27 the clutch-wheels are withdrawn from their fixed clutches. This is done to insure the free operation of the spring-actuated wheels for returning the poises to zero. The poise D is propelled toward the fulcrum of the steelyard by its spring-actuated wheel 23 until the steelyard balances truly and breaks contact with the screw 5. The electro-magnet 29 becomes demagnetized, the armature-lever 28 is pulled off by its spring, and the pawl 27 falls into the upper teeth 26 of the poise D and stops it at the exact position where it is in equilibrium with the load, the overbalance of the steelyard being corrected and the balance finely adjusted by the automatic partial return movement of the light poise.

When the load is removed from the platform, the steelyard remains in contact with the lower screw 5 during the whole return movement of the poise D, and the said poise strikes the contact-lever 55 at the end of its inward movement. This breaks the communication between wires 91 and 92 and makes the connection between the wires 91 and 93. The current passes from wire 93, through the switch-lever 95, screw 96, and wire 98, to the electro-magnet 54, which attracts its armature 102 (see Fig. 16) and lifts the pawl 53 of poise F out of gear with the ratchet-teeth, thereby permitting the spring-actuated wheel 61 to drive the said poise F back to its zero position, the circuit from the electro-magnet being completed by the wire 99, which is connected to the return-screw 72. When the poise F completes its instroke, it strikes the switch-lever 95, breaks its connection with screw 96 and wire 98, and connects said switch-lever with screw 97, which is connected to switch-lever 62 by a wire 97'. From switch-lever 62 the current passes through screw 64 and wire 100 to the electro-magnet 58, from which the circuit is completed by the wire 101, which connects it with the connecting-screw 72, which is always in permanent connection with battery M by wire 73. The electro-magnet 58 attracts the armature 102' and lifts the pawl 59 out of gear with the ratchet-teeth of poise E, and the said poise is propelled inward by its spring-actuated wheel 60. When the poise E arrives at the end of its instroke, it strikes the contact-lever 62 out of contact with the screw 64, and as screw 63 is not connected to the battery the circuit is interrupted, all the poises are at zero, the steelyard is in equilibrium, and the machine is ready to weigh another load.

The arrangement of the stop-pawl and electro-magnet armature is the same for the two poises E and F, and they are provided with similar spring-actuated wheels for returning them to zero. Figs. 16 and 17 show this clearly. The pawl 53, mounted on shaft 103, falls into the teeth by its own weight and forms with the armature 102, to which it is secured, a bell-crank lever, which is pivoted on the shaft or pin 103, so that when the armature is attracted by the pole-pieces 104 the pawl is lifted out of gear with the ratchet-teeth.

Figs. 18 and 19 show to a larger scale the details of the connecting-screws 4 and 5, the contact-springs 6 and 7, the lever 15, and the connection of wire 65 and its branches with said parts.

Either poise can be traveled by a single rack, as shown in Figs. 20 and 21, if desired. In Fig. 21, E is the heavy poise, having teeth on its under side. H is the revoluble electric motor, connected to the main shaft G by toothed wheels 19 20 21, similar to those before described. The shaft G is not, however, connected direct to the poise by a toothed wheel, but by intermediate ratchet mechanism. A cam 113 is revolubly connected to shaft G and revolves in the direction of the arrow and lifts the lever 114 against the tension of spring W. The propelling-pawl 106 is pivotally secured to lever 114, and both are pivoted on the pin 105. The cam depresses the pawl out of the poise-teeth at each revolution of shaft G, and the spring W advances the poise E through the full space of one tooth every time the cam releases the lever 114. The arrangements for interrupting the circuit when the steelyard balances, or the poise arrives at the end of its travel, are similar to those already described, and the spring-actuated wheel to return the poise E to zero is also the same. The stop-pawl 107 automatically gears into the ratchet-teeth and is withdrawn when required by the electro-magnet 108, which attracts the pivoted armature 109, connected to pawl 107 by link 110, and thereby trips the pawl. To allow the spring-actuated wheel to return the poise when the pawl 107 is withdrawn, an arm 111 is secured to said pawl, and is adapted to strike up the arm 112 of pawl 106, so that both pawls are withdrawn from the ratchet-teeth simultaneously by the electro-magnet 108.

It sometimes happens that the movement of poise E through a half or other fraction of a ratchet-tooth may overbalance the steelyard and interrupt the circuit. The spring W, however, drives the poise forward the full space of the tooth whether the current continues or not, and the exact balance of the steelyard is obtained by a short automatic return movement of the light poise, as hereinbefore described.

It is obvious that a weighted lever may be used as the equivalent of spring W.

In Fig. 20 an arrangement is shown in which a reciprocating electric motor H' is substituted for the revoluble motor H. R is the reciprocating armature of motor H', which vibrates the pivoted levers S and T. The lever S is pivoted on pin 105 and has the propelling-pawl 106 secured to its upper end. The stop-pawl 107 is operated by an electro-magnet 108, similar to that before described, and shown in Fig. 21. The lever T vibrates the pivoted lever U, which is a switch-lever, and is provided with a non-conducting piece 108'. The current is passed through spring V and lever U to the electro-magnet. When the armature R is attracted, the non-conducting piece is interposed between the spring V and the lever U and the current is interrupted. The spring W then pulls off the armature and withdraws the pawl 106 to engage with another tooth, at the same time moving the switch-lever U into electrical contact with spring V, so that the electro-magnet is again excited. The action of spring W is here the reverse of the spring W in Fig. 21; but it might be arranged to operate in exactly the same manner, and the attraction of armature R would then be made to withdraw the pawl 106. Whichever way these parts are arranged, and whether the motor reciprocates or revolves, their action on the poise is similar, and so long as a current is supplied to the motor the poise travels forward one tooth at a time. When the spring W is not used to propel the poise, (see Fig. 20,) there is, however, a slight disadvantage, because if the steelyard leaves the upper contact-screw when the poise has been moved through a fraction of the space of a ratchet-tooth and the motor stops instantly the spring-actuated return-wheel may force the poise back again to the beginning of the tooth, where it is arrested by the pawl, and so allow the steelyard to rise again to the upper contact-screw. This action would restart the motor, and a continued repetition of the same movements would set up a vibrating motion of the steelyard and cause delay in weighing.

In Figs. 22 to 25 a modification of the electrical weighing-machine is shown having two poises, both of which are shown at their zero position, and the steelyard end is swinging freely between screws 4 and 5. The construction of the steelyard-frame is in all essential points similar to that before described; but the switch-levers are arranged with sliding instead of touching contacts. Similar letters and numbers are used to designate the same or similar parts. In this modification of the machine a single fixed clutch 115 is secured to the main shaft G. (See Fig. 25.) This clutch has its opposite sides serrated. The clutch-wheel 18 of the light poise D has clutch-teeth 37, which engage with one side of the fixed clutch, and the clutch-wheel 45 of the heavy poise E is adapted to engage with the teeth on the opposite side of the said fixed clutch. The electro-magnets I I' act upon an armature-lever which moves the clutch-wheel 18 into and out of gear with the clutch 115, and the electro-magnets K K' operate the clutch-wheel 45 is a similar manner. The light-poise contact-levers are numbered 41 and 35 and the heavy-poise contact-levers 47 and 62. Various approved forms of registering devices may be applied. In Fig. 24 a small revoluble disk 128 is numbered to indicate up to twenty-five kilograms and is geared to the light poise. The disk revolves as the poise advances, and the weight is indicated by the figure which is visible through the hole 150 in the fixed plate 128', which may be a portion of the casing of the machine. The heavy poise is provided with the large revoluble disk, which indicates up to five hundred kilograms in a similar manner.

With a three-poise machine the registering devices shown in Figs. 1, 2, and 7 may be used. The light poise D drives the pinion 25 through the wheel 23. A disk 116, numbered for pounds, is secured to the same shaft 25' as pinion 25, and its numbers are exhibited through a hole 150 in a fixed plate similar to that shown in Fig. 24. Quarters of hundred-weights are indicated by the numbers on a quadrant 117 being brought before a second hole 151 in the fixed plate. The quadrant 117 and the small lever 119 (see Fig. 2) are secured to the shaft 118, and the lever 119 has a small roller 151 on its end, which runs upon the stepped rail 35, secured to the poise D. Each successive step raises the lever 119 and moves the quadrant so as to indicate an additional quarter. When the poise D is full out, the quadrant 117 indicates three-quarters and the disk 116 indicates just short of twenty-eight pounds.

The heavy poises E and F are geared, as shown in Fig. 10, by intermediate driving mechanism to the disks 120 and 121, which indicate hundred-weights. The disk 120 indicates first, while the disk 121 remains stationary, said disk 121 being provided with a hole opposite the hole in the fixed plate to allow the figures on disk 120 to be visible therethrough. When the poise E has traveled full out, the poise F commences to move the disk 121, which also indicates hundred-weights.

The quadrant 122 (see Fig. 1) is adapted to indicate tons, and it is moved by two levers 123 and 124, secured on the shaft 125, which supports said quadrant. The lever 123 (see Fig. 7) first comes in contact with a stepped rail 126, secured to poise E, and after the quadrant has registered as many tons as there are steps on said rail 126 the similar stepped rail 127, secured to poise F, engages with the lever 124 (see Fig. 2) upon shaft 125 and moves the quadrant 122 farther to indicate additional tons in a similar manner. The quadrant 122 thus indicates tons, the disk 121 hundred-weights, the quadrant 117 quarters, and the disk 116 pounds, each indication being read through a hole in a fixed plate or by its being brought opposite a stationary pointer.

Tension-springs 154 are secured upon the shafts 118 and 125 to prevent vibration. Buffers 155 are provided at the ends of the travel of the poises for the wheels 153 to strike against in the modification shown in Fig. 23, and 156 are bars or brackets for supporting various moving parts of the machine which are connected to the beam.

What I claim is—

1. In an electric weighing-machine, the combination, with two electric contact-pieces, of a pivoted beam provided with a separate end piece pivoted to it and having elastic buffer-springs on each side of the pivot, whereby said end is rendered flexible and adapted to strike lightly against said contact-pieces.

2. In an electric weighing-machine, the combination, with a stationary electric contact-piece, of a pivoted beam provided with a separate articulated end piece and a spring for holding the said end piece in an operative position with respect to the said beam, so that it may strike lightly against the said contact-piece.

3. In an electric weighing-machine, the combination, with two stationary electric contact-pieces, of a pivoted beam provided with an articulated end piece, springs for holding the said end piece in an operative position with respect to the said beam, and two insulated contact-springs secured to the said end piece and adapted to strike lightly against the said contact-pieces, substantially as set forth.

4. In an electric weighing-machine, the combination, with the pivoted beam, of a friction-lever pivoted to a fixed support and bearing against the beam and an electro-magnet automatically holding said lever clear of the beam when not in equilibrium with the load.

5. In an electric weighing-machine, the combination, with the fixed bracket and the insulated contact-screws supported thereby, of a beam provided with insulated contact-pieces oscillating between said screws, a lever pivoted to said bracket and provided with an adjustable weight normally causing the lever to bear against the beam end, and an electro-magnet constantly in circuit with the said contact-screws and adapted to hold said lever clear of the beam as long as either of said screws and pieces are in contact with each other.

6. In an electric weighing-machine, the combination, with a beam, of a poise sliding on said steelyard, a revoluble main shaft, an electric motor secured to the said beam and operatively connected with said shaft, intermediate driving mechanism operatively connected with the said poise, an electrically-controlled clutch device connecting the said driving mechanism with the main shaft, and electric contact-pieces adapted to be separated by the descent of the beam as soon as the poise balances the load, thereby stopping the motor by switching off the electric current and simultaneously permitting the said poise to be automatically disengaged from operative connection with the main shaft.

7. In an electric weighing-machine, the combination, with the beam, of the sliding poise provided with a toothed rack, a revoluble actuating device operatively connected with said rack, and an electric motor secured to the beam and adapted to revolve said device and propel the rack.

8. In an electric weighing-machine, the combination, with the beam, of the sliding poise provided with a toothed rack, a revoluble device for propelling said rack, an electric motor secured to the said beam, a revoluble main shaft operatively connected to said motor, clutch mechanism adapted to couple the said rack-propelling device to the main shaft, and an electro-magnet included in circuit with the said motor for controlling said clutch mechanism, substantially as set forth.

9. In an electric weighing-machine, the combination, with the beam, of the sliding poise provided with ratchet-teeth, a revoluble device for propelling the poise, an electric motor secured to the beam and operatively connected with said poise-propelling device, a pivoted pawl normally engaging with the poise-teeth, and an electro-magnet included in circuit with the said motor for controlling said pawl, substantially as set forth.

10. In an electric weighing-machine, the combination, with the beam, of the poise sliding thereon and provided with teeth, an electric motor secured to the said beam and operatively connected with a revoluble main shaft, a revoluble device adapted to propel the poise, clutch mechanism connecting said revoluble device with the main shaft, a spring-actuated toothed wheel gearing into the poise-teeth for automatically returning the poise, a pivoted pawl normally engaging with the poise-teeth, and separate electro-magnets for raising the pawl when required and controlling the said clutch mechanism, substantially as and for the purpose set forth.

11. In an electric weighing-machine, the combination, with a beam, of two rails secured thereto lengthwise and in line with each other, a poise provided with end wheels running on said rails, a guide-wheel above the poise, and an electric motor secured to the said beam and operatively connected with the poise between the adjacent ends of said rails for propelling it along the rails.

12. In an electric weighing-machine, the combination, with a beam, a revoluble main shaft supported thereby, and an electric motor operatively connected to said shaft, of two separate poises sliding on the beam, each provided with an electrically-controlled clutch mechanism for coupling it to said main shaft and causing it to be traveled outward, and a stop mechanism—such as a pawl—for preventing its return, and an electric switch at the out end of the beam for the first poise to strike against, thereby uncoupling its own clutch mechanism from the main shaft and coupling the clutch mechanism of the second poise with said shaft, so that the second poise is caused to commence its out travel.

13. In an electric weighing-machine, the combination, with a beam, a revoluble main shaft supported thereby, an electric motor operatively connected to said shaft, and electric contact-pieces adapted to keep the motor in circuit until separated by the descent of the beam, of a series of poises sliding on the beam, each provided with an electrically-controlled clutch mechanism for coupling it to the said main shaft, which causes it to be traveled outward, and a stop mechanism—such as a pawl—for preventing its return, and a separate electric switch for each poise to strike against at the out end of its travel, each switch except the last being adapted to uncouple the clutch mechanism of its own actuating-poise from the main shaft and to couple the clutch mechanism of the poise next to it in the series with said shaft, and the last switch being adapted to uncouple the clutch mechanism of the last poise in the series from the main shaft and to stop the motor by breaking the circuit upon the said last poise having failed to cause the descent of the beam end.

14. In an electric weighing-machine, the combination, with a beam and electric contact-pieces adapted to be separated by the ascent of the beam, of a series of poises sliding on the beam, each provided with an operating device—such as a spring-actuated wheel—for returning it to zero, and an electrically-controlled stop device—such as a pawl—for normally preventing such return movement, the said stop device of the first poise in the series being moved to permit the return of the first poise by the current passing to it through the said beam-contacts, and a separate electric switch for each poise to strike against at the end of its return-travel, each switch except the last being adapted to move the electrically-controlled stop device of the poise next below it in the series, so as to permit said poise to accomplish its return-travel, and all the said switches being adapted to cut out the electrically-controlled stop devices of their own actuating-poises from the circuit, which is finally interrupted by the rise of the beam.

15. In an electric weighing-machine, the combination, with a beam provided with a series of poises, an electric motor secured to the said beam for propelling the poises along the beam, and electrically-controlled clutch-mechanisms for causing said poises to be operated in succession, of an electricity-generating device for working the motor and a separate electricity-generating device for operating all the necessary switches and the said clutch mechanisms and placing the said motor in circuit with its said separate electricity-generating device.

16. In an electric weighing-machine, the combination, with the beam and the poises sliding thereon, of the electro-magnet N, provided with a spring actuated armature, the plate P, the pivoted segment electrically connected with said plate and operated by the said armature and provided with the non-conducting piece 86, the insulated spring 84, adapted to contact with the said segment and its non-conducting piece, an electric motor secured to the steelyard for propelling the poises, an electric battery, and wires connecting one pole of the motor with one pole of the battery, the other pole of the motor with said spring, and the other pole of the battery with the said plate, whereby said motor may be stopped and started by the said electro-magnet.

17. In an electric weighing-machine, the combination, with a beam, one or more poises sliding thereon, a revoluble main shaft, and one or more clutch mechanisms permitting each poise to be operatively connected with said shaft, of two separate electro-magnets for throwing each clutch mechanism into and out of gear, the electro-magnet N, provided with a spring-actuated armature and placed in circuit with each throwing-in electro-magnet, a switch operated by the motion of the steelyard for cutting each said throwing-in electro-magnet out of the said circuit, the plate P, the pivoted segment electrically connected with said plate and operated by the said armature and provided with the non-conducting pieces 86 and 90, the insulated spring adapted to contact with said pieces and the metal between them, the electric battery O, a wire connecting one pole of the battery with the said plate, and wires connecting each throwing-out electro-magnet with the said spring and with the other pole of the battery, whereby a momentary current may be sent through each said throwing-out electro-magnet to throw out whichever clutch mechanism has been freed from the action of its throwing-in electro-magnet by its cutting-out switch.

18. In an electric weighing-machine, the combination, with a beam, a poise sliding thereon and provided with ratchet-teeth, and an automatic operating device—such as a spring-actuated wheel—for returning the poise to zero, of a pivoted pawl provided with an arm forming a bell-crank lever with said pawl and an electro-magnet adapted to attract said arm and permit the return of the poise by raising the pawl out of gear with the ratchet-teeth, the said operating device, pawl, and electro-magnet being secured to the said beam, substantially as set forth.

19. In an electric weighing-machine, the combination, with a traveling poise having teeth upon its under side, of a pivoted propelling-pawl provided with a spring and with an arm 112, an electric motor operatively connected with said pawl, whereby the poise is propelled by the conjoint actions of said spring and motor, a pivoted stop-pawl also engaging with the poise-teeth, an electro-magnet, and a pivoted armature operated by said magnet and connected to the stop-pawl and provided with an arm for striking up the said arm on the propelling-pawl, whereby both pawls are withdrawn from the teeth simultaneously.

20. In an electric weighing-machine, the combination, with a traveling poise having teeth upon its under side, of a pivoted propelling-pawl, a spring for moving the pawl in the direction necessary to advance the poise, an electric motor, and a revoluble cam driven by said motor and adapted to effect the return movement of the pawl, the said motor, cam, spring, and pawl being secured to the said beam, substantially as set forth.

21. In an electric weighing-machine, the combination, with a beam, one or more poises sliding thereon, and an electric motor for actuating the poises, of an indicator-plate connected to each poise and having a circumferential motion imparted thereto by the poise, whereby the position of the poise may be indicated by the numbers on the plate which appear opposite a fixed portion of the machine.

22. In an electric weighing-machine, the combination, with a beam, a poise sliding thereon, and an electric motor for operating said poise, of a stepped rail secured to the poise, an indicator-plate mounted on a shaft, and a lever secured to said shaft and adapted to be raised by the steps on the rail, whereby a circumferential motion is imparted to the indicator-plate, substantially as and for the purpose set forth.

In testimony whereof I affix my signature in presence of two witnesses.

WILLIAM SNÊLGROVE.

Witnesses:
GEO. C. MARKS,
WILLIAM EVANS.